Oct. 18, 1932.   F. A. SMITH   1,883,026
AUTOMOBILE LOCK
Filed Nov. 27, 1931
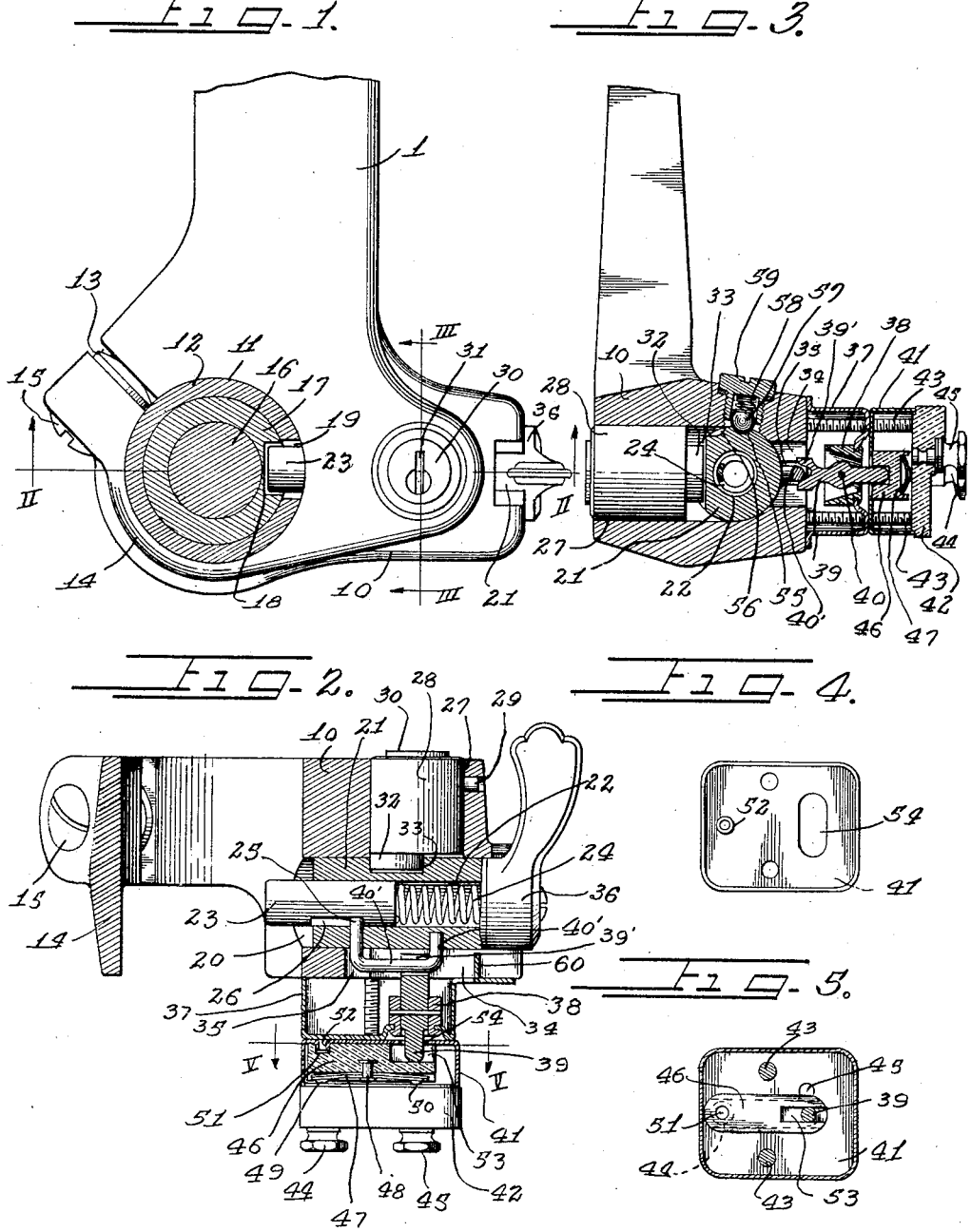

Patented Oct. 18, 1932

1,883,026

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

AUTOMOBILE LOCK

Application filed November 27, 1931. Serial No. 577,664.

My invention relates to lock structures for locking the steering and the ignition of an automotive vehicle and refers particularly to the type of lock structure in which a locking bolt is reciprocable to lock or unlock the steering, and is rotatable to control the switch for the ignition circuit, but with control of the switch possible only when the locking bolt is in steering unlocking position.

An important object of the invention is to provide improved means for locking the bolt against rotation when in steering locking position and improved cooperation of the bolt with the switch mechanism.

Another object is to simplify the construction and arrangement of the various parts so that the parts may be more readily assembled and the cost of manufacture reduced.

The above referred to and other features of the invention are incorporated in the lock structure disclosed on the drawing, in which drawing Figure 1 is a plan view of the lock structure with the steering post and shaft to which the lock structure is applied, in section;

Figure 2 is a section on plane II—II of Figure 1;

Figure 3 is a section on plane III—III of Figure 1;

Figure 4 is a plan view of the housing for the switch mechanism; and

Figure 5 is a section on plane V—V of Figure 2.

The lock structure comprises a laterally extending body 10 having the cylindrical vertical passageway 11 for receiving the steering column 12 of an automobile, a slot 13 leaving the semi-circular section 14 of the body yieldable so that it may be clamped by a screw 15 to securely hold the body to the steering column. Extending through the steering column is the steering shaft 16 connected in practice with the steering wheel (not shown), this shaft having a collar 17 secured thereto provided with a locking slot 18 which will be in register with the passageway 19 through the steering column when the steering wheel is in a certain position, usually in position for straight ahead travel of the front wheels.

The body 10 has the cylindrical bore 20 therethrough in register and concentric with the passageway 19 through the steering column and in this bore 20 a locking bolt 21 is adapted for reciprocation and also rotation. The locking bolt has the longitudinally extending pocket 22 for guiding the locking bar 23, a spring 24 behind the bar tending to shift it outwardly. The movement of the locking bar in the locking bolt is limited by the engagement of a pin 25 with the ends of a groove 26 cut in the bar.

A cylindrical passage or pocket 27 extends upwardly through the body 10 and communicates at its lower end with the bore 20 and receives a lock cylinder 28 which may be secured in place by a suitable screw or pin 29. The lock barrel 30 which may be turned by a proper key inserted in the keyhole 31, terminates at its inner end in a cam member 32 which is eccentric relative to the lock barrel axis and engages in the transverse slot 33 in the locking bolt so that when the barrel is turned by the key the locking bolt will be shifted axially either to steering locking or unlocking position. The lock barrel has a maximum rotation of 180° and at the end of each movement the cam 32 will lock the locking bolt in the corresponding position to which it has been shifted.

When the locking bolt is shifted inwardly any time when the notch 18 of the steering shaft is in alignment with the passage 19 of the steering column, the locking bar 23 will enter the notch and lock the steering shaft. If the notch 18 is not in register with the passageway 19 then the locking bar 23 will abut against the cylindrical surface of the collar 17 until such time as the steering wheel is rotated to bring the notch into alignment with the passage 19, the spring 24 then forcing the locking bar into the notch.

The stop pin or key 25 for the locking bar 23 extends outwardly from the locking bolt 21 into a longitudinal slot or passageway 34 in the body 10, and when the locking bolt is in steering locking position the pin is within the comparatively narrow notch or pocket 35 extending from the inner end of the slot 34 so that the locking bolt will be held against rotational movement when it is in its inner or locking position. When the bolt is shifted outwardly by turning of the key in the lock barrel 30 the pin 25 will be moved out of the notch 35 into the wider slot 34 and then the locking bolt may be rotated as by means of a lever 36 secured to the outer end of the bolt.

Describing now the switch mechanism controlled by rotational movement of the locking bolt, a rectangular sheet metal frame 37 is applied against the body 10 below the slot 34 and in its lower wall secures a hollow supporting member 38 in which a switch lever 39 is pivoted on a cross spindle or pin 40. The upper forked end 39' of the switch lever receives an arm or abutment 40' secured to and extending from the locking bolt 21, this arm extending a distance longitudinally with the locking bolt to form an extended abutment surface for the switch lever. As shown this abutment arm and the stop pin 25 may form an integral member of U shape of which the one leg forms the stop pin 25 and the other leg extends into the locking bolt to form a support, the yoke part 40' then forming the extended abutment for the switch lever and engaging in the forked end of the lever so that when the locking bolt is rotated the switch lever will be correspondingly swung. Such swing of the switch lever can be accomplished only when the locking bolt has been shifted outwardly to unlocking position, that is, when the inner or pin end 25 of the abutment member is withdrawn from the slot 35.

Engaging against the under side of the housing 37 is the housing 41 having its lower open end closed by a plate or block 42 of insulating material. Screws 43 may be provided to extend through the block 42 and the housings 41 and 37 and to thread into the body 10 to thus secure the parts together in proper alignment.

The block 42 supports the terminal posts 44 and 45 whose inner ends are flush with the inner face of the block 42. Within the housing 41 is a switch block 46 of oblong shape supporting on its under side a switch blade 47 which is secured by means of a rivet 48 engaging midway between its ends. The ends of the switch blade have contact deflections 49 and 50 for engaging with the terminal posts 44 and 45 respectively. In the under side of the switch block 46 at one end thereof is a pivot hole 51 for receiving the pivot deflection or extension 52 which may be formed by deflecting the metal from the bottom of the housing 41, the switch block being thus mounted for swinging movement. At its other end the block has the longitudinally extending slot or channel 53 into which the lower end of the switch lever 39 extends, the bottom wall of the housing 41 having a clearance passageway 54 for the lever end. With this arrangement, when the locking bolt is rotated by means of its lever or handle 36 the switch block will be swung to control the ignition circuit which in practice is connected with the terminal posts 44 and 45. The arrangement is such that the contact point 49 of the switch blade is below the pivot of the switch block and will at all times be in engagement with the terminal post 44. As best shown in Figure 3 the terminal post 45 is offset laterally a distance so that when the locking bolt 21 is in its inner or steering locking position the switch lever 39 will be held to hold the switch block with its switch blade contact end 50 disconnected from the terminal post 45 so that the ignition circuit will be opened. However when the locking bolt is shifted outwardly and rotated the switch block will be swung so that its blade will engage with both terminal posts for closure of the ignition circuit.

To yieldably lock the locking bolt in its respective positions for opening and closing the ignition circuit, the bolt has the longitudinally extending locking notches 55 and 56 for receiving a ball 57 which is yieldably held in the notches by a spring 58 within a plug 59 having threaded engagement in the body 10. The notch 55 in cooperation with the ball serves also to guide the locking bolt during its axial shifting movement. For frustrating any attempt to remove the locking bolt from the lock structure body a tongue 60 may be deflected upwardly from the housing 39 to extend across the slot 34 in front of the abutment member 40'.

Briefly summing up the operation, Figures 1, 2, and 3 show the parts in position with the locking bolt locking the steering and the switch lever 39 holding the switch open. For operation, a suitable key is inserted in a keyhole 31 and turned to shift the locking bolt outwardly to unlock the steering and at the same time to release the pin end 25 from the slot 35. The bolt 21 is now free for rotational movement by means of the lever 36 and when swung upwardly the switch lever 39 will be swung to cause swing of the switch block to carry its switch blade for contact with both terminal posts 44 and 45 for closure of the ignition circuit. When the locking bolt has been thus rotated for closure of the ignition circuit the locking part or pin 25 will be in front of the inner end of the slot 34 at one side of the notch 35 so that it will be impossible to shift the locking bolt back to locking position by turning of the key in the lock 30, but the locking bolt must first be rotated back to position for opening of the ignition circuit and to bring the part 25 into registration with the notch 35. The lock may now be turned by the key for shifting the bolt back to locking position, in which position the parts will be held to hold the ignition circuit open. During axial shifting of the locking bolt the yoke 40' of the abutment structure will pass through the forked end of the switch lever 39 but the lever will not be turned until the locking bolt is rotated. After shift of the locking bolt to steering unlocking position it may be freely rotated for opening or closing the ignition circuit.

I have shown a practical and efficient embodiment of the various features of my invention but I do not desire to be limited to the details shown and described as changes and modifications may be made without departing from the scope of the invention as defined in the appended claims.

I claim as follows:

1. A switch structure comprising a body having a bore therethrough, a locking bolt adapted for shifting movement and for rotational movement in said bore, means for shifting said bolt into locking or unlocking position, means preventing rotational movement of said bolt when it is in locking position, a switch lever having a forked end, an actuating member on said bolt receiving said forked end of the switch lever and adapted to swing said lever when said bolt is rotated, and switch means controlled by the swing of said switch lever.

2. An automotive switch structure comprising a body having a bore therethrough, a locking bolt adapted for axial and rotational movement in said bore, means for shifting said bolt axially into locking or unlocking position, an abutment extending from said locking bolt, said body having a recess for receiving said abutment whereby to prevent rotational movement of said bolt when it is in locking position, switch mechanism, a switch lever extending into the path of said abutment member to be swung when said locking bolt is rotated, and means whereby swing of said lever actuates said switch mechanism for circuit controlling operation.

3. A lock structure comprising a body having a bore therethrough, a locking bolt adapted for reciprocable and rotational movements in said bore, means for reciprocating said bolt into locking or unlocking positions, a switch having an actuating member, a member extending from said locking bolt into cooperative relation with said switch actuating member, means whereby said extension member may move independently of movement of said actuating member when said locking bolt is reciprocated and means whereby said extension member will cause movement of said actuating member and operation of said switch mechanism when said locking bolt is rotated, and a locking recess in said body receiving said extension member when said locking bolt is in locking position whereby to prevent rotational movement of said locking bolt.

4. A lock structure comprising a body having a bore therethrough, a locking bolt adapted for reciprocation and rotational movement in said bore, means for reciprocating said bolt to locking or unlocking positions, a switch, an actuating lever for said switch having a forked end, an extension on said locking bolt engaging in the forked end of said lever, said extension being parallel with the axis of said locking bolt whereby said extension will shift through said forked end without actuating said lever during reciprocating movement of said bolt, means for retaining said extension member to prevent rotational movement of said bolt when said bolt is in locking position but to release said bolt for rotation when it is shifted to unlocking position, said lever being actuated by said extension during rotational movement of said locking bolt to cause operation of said switch.

5. A lock structure comprising a body having a bore therethrough, a locking bolt adapted for reciprocation and rotational movement in said bore, a locking bar reciprocable in said bolt, a spring tending to shift said bar outwardly, said bar having stop shoulders, circuit controlling switch mechanism, an operating member associated with said switch mechanism, an actuating member extending from said locking bolt and having a part cooperating with the shoulders of said bar for limiting the reciprocation of said bar in said bolt, means whereby said actuating member will move independently of said operating member when said locking bolt is reciprocated, means whereby said operating member will be moved to operate the switch mechanism when said locking bolt is rotated, means cooperating with said actuating member to prevent rotational movement of said locking bolt when said bolt is in locking position and for releasing said bolt for rotational movement when it is shifted to unlocking position.

6. In lock structure the combination of a body having a bore, a locking bolt adapted for axial movement and rotational movement in said bore, a locking bar reciprocable in said locking bolt, a spring tending to shift said bar outwardly, said bar having shoulders, circuit controlling switch mechanism, an operating lever for said switch mechanism having a forked end and pivoted for swinging movement, in a plane at right angles to the axis of said locking bolt, a U-shaped actuating member secured to and extending from said locking bolt with its yoke part receiving the forked end of said lever, the yoke of said actuating member being parallel with the bolt axis whereby upon axial movement of said bolt said yoke may pass through the forked end of said lever without movement of the lever, one end of said actuating member cooperating with the shoulders of said bar to limit the reciprocating movement of said bar, a recess receiving said actuating member when said locking bolt is in locking position and to prevent rotational movement of the bolt when in such position, shifting of said bolt to unlocking position releasing said actuating member from said recess whereby said bolt may then be rotated, and means for rotating said bolt, said actuating member during rotation of said bolt causing swing of said operating lever to operate said switch mechanism.

In testimony whereof I have hereunto subscribed my name at North Chicago, Lake County, Illinois.

FREDERICK A. SMITH.